(12) United States Patent
Usui et al.

(10) Patent No.: US 12,742,895 B2
(45) Date of Patent: Sep. 22, 2026

(54) CERAMIC SCINTILLATOR, PHOTON-COUNTING TYPE X-RAY DETECTOR, AND METHOD FOR MANUFACTURING CERAMIC SCINTILLATOR

(71) Applicants: Niterra Materials Co., Ltd., Yokohama (JP); National University Corporation Nara Institute of Science and Technology, Ikoma (JP)

(72) Inventors: Daichi Usui, Kawasaki (JP); Makoto Hayashi, Chigasaki (JP); Takayuki Yanagida, Nara (JP); Noriaki Kawaguchi, Ikoma (JP); Takumi Kato, Ikoma (JP); Daisuke Nakauchi, Ikoma (JP); Hiromi Kimura, Tsukuba (JP)

(73) Assignees: Niterra Materials Co., Ltd., Yokohama (JP); National University Corporation Nara Institute of Science and Technology, Yokohama (JP)

( * ) Notice: Subject to any disclaimer, the term of this patent is extended or adjusted under 35 U.S.C. 154(b) by 739 days.

(21) Appl. No.: 18/176,670

(22) Filed: Mar. 1, 2023

(65) Prior Publication Data

US 2023/0204802 A1 Jun. 29, 2023

Related U.S. Application Data

(63) Continuation of application No. PCT/JP2021/032731, filed on Sep. 6, 2021.

(30) Foreign Application Priority Data

Sep. 4, 2020 (JP) ................................ 2020-148981

(51) Int. Cl.
*G01T 1/202* (2006.01)
*G01T 3/06* (2006.01)

(52) U.S. Cl.
CPC .............. *G01T 1/2023* (2013.01); *G01T 3/06* (2013.01)

(58) Field of Classification Search
CPC ................................ G01T 1/2023; G01T 3/06
USPC .................................................. 252/301.4 R
See application file for complete search history.

(56) References Cited

U.S. PATENT DOCUMENTS

2002/0013215 A1 1/2002 Nakamura

FOREIGN PATENT DOCUMENTS

| | | | |
|---|---|---|---|
| CN | 108863340 | A | 11/2018 |
| JP | S63-198890 | A | 8/1988 |
| JP | 2013-040274 | A | 2/2013 |
| JP | 5462515 | B2 | 4/2014 |
| JP | 2016-088970 | A | 5/2016 |
| JP | 2018-002974 | A | 1/2018 |

(Continued)

OTHER PUBLICATIONS

Japanese Office Action (with English translation) dated Jan. 7, 2025 (Application No. 2022-547002).

(Continued)

*Primary Examiner* — Anita Nassiri-Motlagh
(74) *Attorney, Agent, or Firm* — Muncy, Geissler, Olds & Lowe, P.C.

(57) ABSTRACT

A ceramic scintillator according to the present embodiment has a composition represented by $(Lu_{1-x}Pr_x)_a(Al_{1-y}Ga_y)_bO_{12}$, wherein x, y, a, and b in the composition respectively satisfy 0.005≤x≤0.025, 0.3≤y≤0.7, 2.8≤a≤3.1, and 4.8≤b≤5.2.

12 Claims, 4 Drawing Sheets

(56) References Cited

FOREIGN PATENT DOCUMENTS

JP 2019-044177 A 3/2019

OTHER PUBLICATIONS

Hiraku Ogino et al., "Growth and Luminescence Properties of Pr-doped $Lu_3(Ga,Al)_5O_{12}$ Single Crystals," *Japanese Journal of Applied Physics*, vol. 46, No. 6A, 2007, pp. 3514-3517.

Taku Ogino, et al., "Defect Level Control and Performance Improvement of Single Crystal Scintillators by Substituting Elements," *Journal of the Japanese Society for Crystal Growth*, vol. 35, No. 2, 2008, pp. 81-88. (with English translation) (25 pages).

Lin Feng, et al., "Warm-White Persistent Luminescence of $Lu_3Al_2Ga_3O_{12}:Pr^{3+}$ Phosphor," *Journal of Rare Earths*, vol. 35, No. 1, Jan. 2017, pp. 47-52. (9 pages).

International Search Report and Written Opinion (Application No. PCT/JP2021/032731) dated Nov. 16, 2021.

CORRESPONDENCE TABLE SHOWING RELATIVE LIGHT YIELD [%] CORRESPONDING TO "x" AND "y"

| RELATIVE LIGHT YIELD [%] | | x | | | | | | | | | |
|---|---|---|---|---|---|---|---|---|---|---|---|
| | | 0.002 | 0.005 | 0.006 | 0.010 | 0.013 | 0.016 | 0.020 | 0.025 | 0.030 | 0.040 |
| y | 0.80 | 20 | | 25 | 23 | | | 18 | | 15 | 10 |
| | 0.70 | 29 | 35 | 35 | 39 | | | 31 | 32 | 20 | |
| | 0.60 | 21 | 35 | 39 | 40 | | | 38 | 35 | 25 | 20 |
| | 0.55 | 74 | 74 | 79 | 92 | 45 | 45 | 46 | 41 | 36 | 30 |
| | 0.50 | 80 | 95 | 101 | 139 | 70 | 66 | 66 | 60 | 50 | 41 |
| | 0.40 | 82 | 165 | 174 | 185 | 87 | 79 | 75 | 71 | 60 | 48 |
| | 0.30 | 90 | 150 | 155 | 165 | 80 | 70 | 68 | 65 | 50 | |
| | 0.20 | 97 | | 137 | 145 | | | 88 | 80 | 55 | 47 |
| | 0.10 | 123 | | 133 | 125 | | | 74 | | 42 | 34 |
| | 0.00 | 100 | | 74 | 67 | | | 52 | 40 | 39 | 24 |

30[%] OR MORE

FIG. 3A

CORRESPONDENCE TABLE SHOWING DECAY TIME CONSTANT [nsec] OF LIGHT EMISSION CORRESPONDING TO "x" AND "y"

| DECAY TIME CONSTANT [nsec] OF LIGHT EMISSION | | x | | | | | | | | | |
|---|---|---|---|---|---|---|---|---|---|---|---|
| | | 0.002 | 0.005 | 0.006 | 0.010 | 0.013 | 0.016 | 0.020 | 0.025 | 0.030 | 0.040 |
| y | 0.80 | 5 | | 4 | 3 | | | 3 | | 3 | 3 |
| | 0.70 | 5 | 5 | 5 | 4 | | | 4 | 3 | 4 | |
| | 0.60 | 6 | 6 | 6 | 6 | | | 4 | 4 | 3 | 3 |
| | 0.55 | 10 | 12 | 11 | 9 | 6 | 6 | 6 | 5 | 5 | 5 |
| | 0.50 | 13 | 12 | 11 | 11 | 8 | 8 | 7 | 7 | 7 | 6 |
| | 0.40 | 19 | 15 | 15 | 15 | 12 | 11 | 10 | 9 | 9 | 7 |
| | 0.30 | 20 | 15 | 15 | 14 | 13 | 12 | 10 | 10 | 10 | |
| | 0.20 | 19 | | 18 | 17 | | | 15 | 15 | 16 | 13 |
| | 0.10 | 19 | | 18 | 19 | | | 17 | | 16 | 15 |
| | 0.00 | 29 | | 22 | 19 | | | 22 | 21 | 20 | 19 |

15[%] OR LESS

FIG. 3B

CORRESPONDENCE TABLE SHOWING RELATIVE LIGHT YIELD [%] CORRESPONDING TO "a" AND "b"

| RELATIVE LIGHT YIELD [%] | | a | | | | | | | |
|---|---|---|---|---|---|---|---|---|---|
| | | 2.5 | 2.6 | 2.8 | 2.9 | 3.0 | 3.1 | 3.2 | 3.4 |
| b | 5.5 | | | | | 141 | | | |
| | 5.3 | | | 140 | | 145 | | | 133 |
| | 5.2 | | 139 | 165 | | 170 | 155 | 130 | |
| | 5.1 | | 135 | 175 | | 178 | | 125 | |
| | 5.0 | | | 170 | | 185 | 165 | | 130 |
| | 4.9 | | 110 | 165 | | 180 | | 152 | |
| | 4.8 | | 142 | 160 | 182 | 173 | 164 | 132 | |
| | 4.7 | 101 | | 124 | | | 141 | | |

150[%] OR MORE

FIG. 4A

CORRESPONDENCE TABLE SHOWING DECAY TIME CONSTANT [nsec] OF LIGHT EMISSION CORRESPONDING TO "a" AND "b"

| DECAY TIME CONSTANT [nsec] OF LIGHT EMISSION | | a | | | | | | | |
|---|---|---|---|---|---|---|---|---|---|
| | | 2.5 | 2.6 | 2.8 | 2.9 | 3.0 | 3.1 | 3.2 | 3.4 |
| b | 5.5 | | | | | 14 | | | |
| | 5.3 | | | 15 | | 14 | | | 15 |
| | 5.2 | | 15 | 15 | | 15 | 15 | 15 | |
| | 5.1 | | 15 | 15 | | 15 | | 14 | |
| | 5.0 | | | 15 | | 15 | 15 | | 15 |
| | 4.9 | | 15 | 15 | | 15 | | 16 | |
| | 4.8 | | 15 | 15 | 15 | 15 | 15 | 15 | |
| | 4.7 | 15 | | 16 | | | 15 | | |

15[%] OR LESS

FIG. 4B

CERAMIC SCINTILLATOR, PHOTON-COUNTING TYPE X-RAY DETECTOR, AND METHOD FOR MANUFACTURING CERAMIC SCINTILLATOR

CROSS-REFERENCE TO RELATED APPLICATION

This application is a Continuation Application of No. PCT/JP2021/032731, filed on Sep. 6, 2021, and the PCT application is based upon and claims the benefit of priority from Japanese Patent Application No. 2020-148981, filed on Sep. 4, 2020, the entire contents of which are incorporated herein by reference.

FIELD

An embodiment of the preset invention relates to a ceramic scintillator, a photon-counting type X-ray detector, and a method for producing the ceramic scintillator.

BACKGROUND

Imaging systems using radiation, for example, X-rays are widely used in industrial applications such as baggage inspection and nondestructive inspection, and in medical applications such as X-ray diagnostic equipment and X-ray CT (Computed Tomography) equipment. Current mainstream imaging systems using X-rays are of an energy integration type, and generally have a configuration in which a light-emitting material and a photodetector are combined.

However, the energy integration type has problems that X-ray energy information cannot be obtained and that the exposure dose is large. In recent years, in order to solve these problems, development of photon-counting type X-ray detectors employing a photon-counting method has been advanced. Photon-counting type X-ray detectors are also called photon detectors or photon-counting type detectors.

The photon-counting method is characterized in that pulse signal processing is performed for incident X-ray photons one by one. Photon-counting methods are classified into a direct type that uses a semiconductor such as CdTe to convert X-rays directly into electrical signals, and an indirect type that converts X-rays into light with a light-emitting material and converts the light into electrical signals using a photodetector.

Among the photon counting methods, the direct type can measure X-ray photon energy from the number of carriers, the indirect type can measure the X-ray photon energy from the number of emission photons, and since it is easy to remove noise components, data with a high S/N ratio can be obtained. Due to these advantages, realization of K absorption edge imaging using contrast agents other than iodine and reduction of exposure dose due to low dose measurement is expected in medical applications. The mainstream of research and development in the photon-counting method is the direct type that can obtain high energy resolution. However, it is a problem of the direct type that manufacturing large-area detectors is difficult, because semiconductor materials such as CdTe are expensive, and it is difficult to obtain uniform characteristics.

On the other hand, in the photodetectors of the indirect type among the photon-counting methods, photoelectron multiplier tubes having high multiplication factors are generally used. However, the indirect type has problems that the shape of the photoelectron multiplier tube is large and that pixel configuration with a narrow gap is difficult. A silicon photomultiplier (Si-PM) that is a Si-based photodetector that operates in the Geiger mode, and has recently been developed solves the problems of the photoelectron multiplier tube described above, has a multiplication factor close to that of photoelectron multiplier tubes, and is low cost. Therefore, in the indirect type, it is expected that the use of silicon photomultipliers will expand in the future.

BRIEF DESCRIPTION OF THE DRAWINGS

Each of FIGS. 1A to 1C is a schematic view illustrating a configuration of a photon-counting type X-ray detector according to an embodiment.

Each of FIGS. 3A and 3B is a table showing the characteristics of the fluorescent materials of Examples 1-38 and Comparative Examples 1-42.

Each of FIGS. 4A and 4B is a table showing the characteristics of the fluorescent materials of Examples 39 to 52 and Comparative Examples 43 to 58.

DETAILED DESCRIPTION

Hereinafter, embodiments of a ceramic scintillator, a photon-counting type X-ray detector, and a method for manufacturing the ceramic scintillator will be described in detail with reference to the drawings.

A ceramic scintillator according to the present embodiment has a composition represented by $(Lu_{1-x}Pr_x)_a(Al_{1-y}Ga_y)_bO_{12}$, wherein x, y, a, and b in the composition respectively satisfy $0.005 \leq x \leq 0.025$, $0.3 \leq y \leq 0.7$, $2.8 \leq a \leq 3.1$, and $4.8 \leq b \leq 5.2$.

(Photon-Counting Type X-Ray Detector)

Figure 1A:
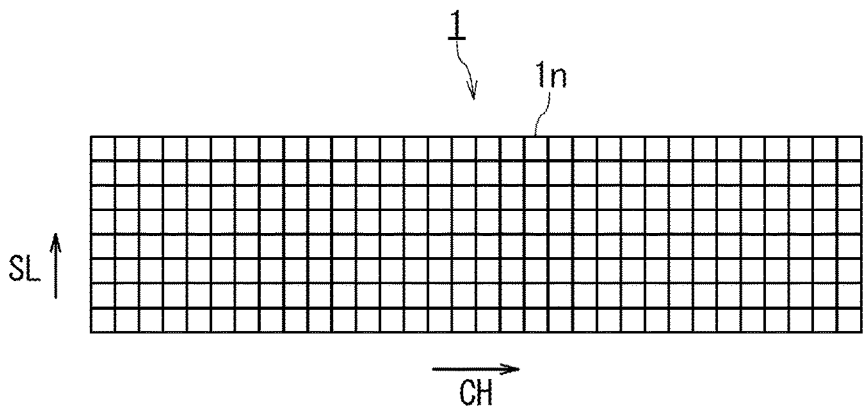
Figure 1B:
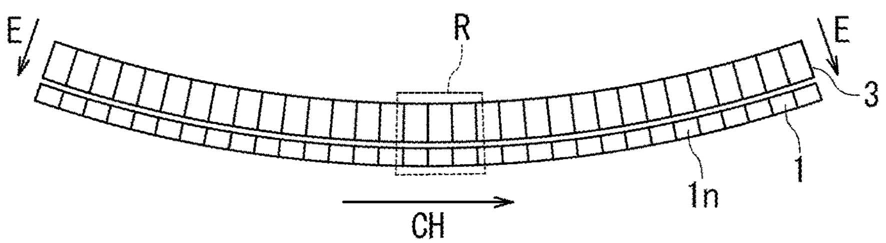
Figure 1C:
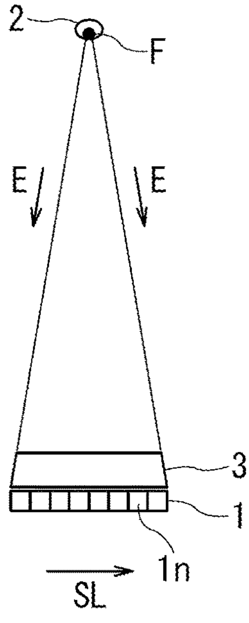

Each of FIGS. 1A to 1C is a schematic view illustrating a configuration of a photon-counting type X-ray detector according to an embodiment. FIG. 1A is a top view of the photon-counting type X-ray detector according to the embodiment. FIG. 1B is a side view illustrating a channel direction CH of the photon-counting type X-ray detector according to the embodiment. FIG. 1C is a side view illustrating a slice direction SL of the photon-counting type X-ray detector according to the embodiment.

Each of FIGS. 1A to 1C illustrates a photon-counting type X-ray detector (hereinafter, simply referred to as an "X-ray detector") 1 according to the embodiment. Each of FIGS. 1B and 1C illustrates a collimator device 3 in addition to the X-ray detector 1. FIG. 1C illustrates an X-ray tube 2 in addition to the X-ray detector 1.

The X-ray detector 1 is installed on a rotating frame of a holding device. The X-ray detector 1 is provided with n (n: a plurality) of X-ray detection elements 1$n$. The X-ray detection elements 1$n$ are arranged two-dimensionally in a matrix form in the channel direction and the slice direction SL. The channel direction means a spread direction of fan beam X-rays emitted from the X-ray tube 2, and the slice direction means a thickness direction of the fan beam X-rays.

An X-ray incident surface of the X-ray detector 1 is formed by X-ray incident surfaces of the X-ray detection elements 1$n$. For example, about 1000 X-ray detection elements 1$n$ are arranged in the channel direction CH, and 64 X-ray detection elements 1$n$ are arranged in the slice direction SL.

The X-ray tube 2 is installed in a rotating frame of a holding device to face the X-ray detector 1. The X-ray tube 2 is a vacuum tube that generates X-rays by irradiating thermal electrons from a cathode (filament) to an anode (target) by applying a high voltage. For example, among X-ray tubes 2, there is a rotating anode type X-ray tube that generates X-rays by irradiating a rotating anode with thermal electrons.

A collimator device 3 has a plurality of collimator plates having a function of absorbing scattered X-rays. The plurality of collimator plates comprise plates that extend in the slice direction SL and are provided to be erected to divide the X-ray detection elements 1*n* in the channel direction CH (one-dimensional collimator). Alternatively, the plurality of collimator plates comprise plates that extend in the slice direction SL and are provided to be erected to divide the X-ray detection elements 1*n* in the channel direction CH, and plates that extend in the channel direction CH and are provided to be erected to divide the X-ray detection elements 1*n* in the slice direction SL (two-dimensional collimator). An inclination of the plate surface of the collimator plate is adjusted to be parallel to an X-ray irradiation direction E that is a direction in which X-rays from an X-ray focal point F of the X-ray tube 2 are irradiated. FIG. 1C illustrates a case in which the collimator device 3 is a one-dimensional collimator. What is made by combining the collimator device 3 with the X-ray detector 1 is sometimes called a “photon-counting type X-ray detector”.

The X-ray detector 1 may be configured by arrangement of a plurality of detector modules by modularizing a predetermined number of X-ray detection elements among the X-ray detection elements 1*n*. Likewise, the collimator device 3 may be configured by arrangement of a plurality of collimator modules by modularizing a predetermined number of collimator plates.

Figure 2:
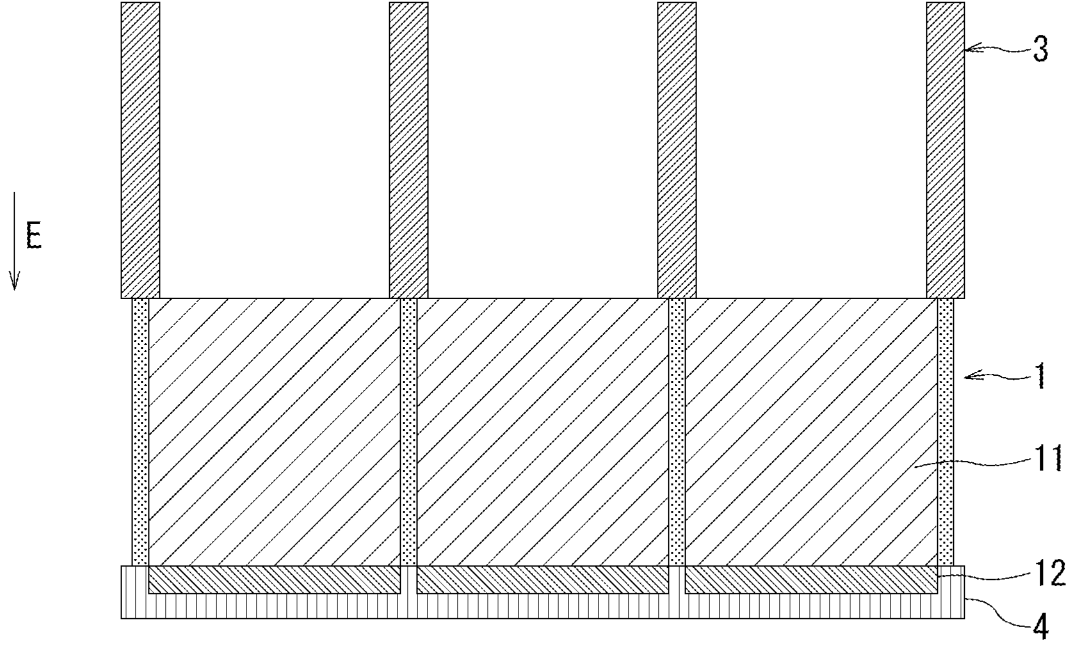
FIG. 2 is an enlarged sectional view of the partial region shown in FIG. 1B in the photon counting type X-ray detector according to the embodiment.

FIG. 2 is an enlarged sectional view of a partial region R illustrated in FIG. 1B in the X-ray detector 1.

The X-ray detection elements 1*n* are provided on a ceramic substrate 4. Each of the X-ray detection elements 1*n* includes a ceramic scintillator 11 and a photoelectric conversion element 12.

The ceramic scintillator 11 is an element that converts incident X-rays into photons and emits the photons. Here, X-rays usually have a predetermined X-ray energy distribution. An X-ray having a specific X-ray energy can be considered a mass of X-ray particles a number of which corresponds to a magnitude of the X-ray energy. The ceramic scintillator 11 converts the X-ray particles into photons with a predetermined probability while maintaining a mass of the X-ray particles. When X-rays are incident on the ceramic scintillator 11, the ceramic scintillator 11 emits substantially simultaneously photon groups in number corresponding to the X-ray energy according to X-ray energy.

The ceramic scintillator 11 is a light conversion element having a substantially rectangular parallelepiped or cubic shape. The ceramic scintillator 11 is disposed so that an X-ray incident surface thereof is substantially perpendicular to an X-ray irradiation direction, that is, the X-ray incident direction E, and a side surface parallel to the X-ray incident direction E is substantially parallel to the channel direction CH and the slice direction SL.

The photoelectric conversion element 12 has a substantially plate-shaped rectangular parallelepiped shape, converts incident photons into electrical signals, and outputs the electrical signals. The electrical signals are electrical pulse signals corresponding to the individual incident photons. When photon groups are simultaneously incident on the photoelectric conversion element 12, the photoelectric conversion element 12 outputs a pulse signal a wave height of which corresponds to a number of photons configuring the photon group. The photoelectric conversion element 12 is a semiconductor device suitable for so-called photon counting, and is, for example, a silicon photomultiplier (Si-PM). A silicon photomultiplier is a high-performance semiconductor photon detector that is capable of photon counting (photon counting) measurement, and is also applicable to analogue measurement such as scintillation detection. A silicon photomultiplier is an element in which a large number of pixels of avalanche photodiodes (APD) that operate in the Geiger mode are connected in parallel.

The photoelectric conversion element 12 receives photons emitted from the ceramic scintillator 11, and outputs electrical signals in a pulse form. When intensity of transmission X-rays of an object is sufficiently low, the photon groups according to X-ray energy are released in a scattered state in a time axis direction, in the ceramic scintillator 11. At this time, the photoelectric conversion element 12 outputs, for each X-ray energy, a pulse signal having a wave height corresponding to the magnitude of the X-ray energy in numbers corresponding to a dose of the X-rays having the X-ray energy, in a state dispersed in the time axis direction. Accordingly, if the pulse signals outputted in a fixed time are counted for each wave height, it is possible to know a dose of transmission X-rays of the object for each X-ray energy. If all the pulse signals outputted in a fixed time are counted regardless of wave heights, it is possible to know a dose of all transmission X-rays of the object.

To the photoelectric conversion element 12, conductor patterns (not illustrated) formed on the ceramic substrate 4 are respectively connected. The electrical signals from the photoelectric conversion element 12 are outputted to an external processing device (not illustrated) through these conductor patterns. The electrical signals outputted from the photoelectric conversion element 12 are used in collection of projection data by a photon-counting method.

Here, a detector used in the photon-counting method generally has a very high X-ray detection sensitivity. The detector has high sensitivity, that is, can obtain signals with sufficient S/N, even if the dose of X-rays is low, and a number of photons emitted from the scintillator is small. However, when the dose of X-rays is large, the pulse signals are superimposed, a phenomenon called pile-up (pile up) occurs, and it becomes impossible to resolve the signals in the time axis direction.

Among the photon counting methods, in the case of the indirect type, there is a problem of counting rate as in the case of the direct type. The counting rate indicates the number of incident X-ray photons per unit area per unit time. In order to realize imaging by a photon-counting type X-ray detector, a detector handling with a high counting rate is necessary. For example, a counting rate required in X-ray CT equipment is 107 [cps/mm$^2$] or more. This means that X-ray photons are incident at intervals of 100 [nsec] on average. At present, a scintillator capable of handling with such a high counting rate has not been put into practical use. If the counting rate exceeds a capacity of the scintillator, pile-up occurs, and it becomes difficult to measure correct photon energy. On the other hand, suppressing the counting rate and performing measurement for a long time causes problems such as a decrease in throughput and a decrease in time resolution.

The counting rate of a scintillator is mainly determined by a response speed of the material. Therefore, there is an urgent need to develop materials for scintillators with improved response speeds so as not to cause pile-up while avoiding long-time measurements.

(Ceramic Scintillator and Manufacturing Method Thereof)

A main factor that determines the response speed of the indirect type is a decay time constant of light emission of a scintillator. In order to realize the aforementioned counting rate 107 [cps/$mm^2$], control of the decay time constant of light emission of the scintillator becomes particularly important, and the decay time constant of light emission needs to be about 15 [nsec] or less. By making the decay time constant of light emission 15 [nsec] or less, it becomes possible to prevent pile-up and realize imaging at a practical level as described above. Thus, experiments were conducted with an aim of setting the decay time constant of light emission of the scintillator to about 15 [nsec] or less. As a result, it was found that a relative light yield of 30[%] or more is good. This is because if the relative light yield is 30[%] or more, there is no problem in both the S/N ratio and the energy resolution, and a detector with higher accuracy can be obtained.

In other words, it is desirable that the decay time constant is 15 [nsec] or less and the relative light yield is 30[%] or more. For this purpose, a fluorescent material of the ceramic scintillator 11 that is applied as the light conversion element has a composition represented by $(Lu_{1-x}Pr_x)_a(Al_{1-y}Ga_y)_bO_{12}$, wherein x, y, a, and b in the composition respectively satisfy all of $0.005 \leq x \leq 0.025$, $0.3 \leq y \leq 0.7$, $2.8 \leq a \leq 3.1$, and $4.8 \leq b \leq 5.2$.

As a result of the experiments, it was found that there is a trade-off relationship as shown in Table 1, and if the relationship in Table 1 is further satisfied, it is possible to realize detection with higher accuracy by the detector.

TABLE 1

| Decay Time Constant of Light Emission | Relative Light Yield |
|---|---|
| 15 [nsec] | 150 [%] or more |
| 10 [nsec] or more less than 15 [nsec] | 65 [%] or more |
| less than 10 [nsec] | 30 [%] or more |

Subsequently, a result of producing fluorescent materials according to examples 1 to 52 (Table 2, Table 4) having the above-described composition, and fluorescent materials according to comparative examples 1 to 58 (Table 3, Table 5), and investigating characteristics of the relative light yield (or relative light emission intensities), and the decay time constants of light emission respectively will be described. The fluorescent materials according to examples 1 to 52, and the fluorescent materials according to comparative examples 1 to 58 are produced through the following steps. First, in a first step, powder of a mixture (mixture of oxide powders of Lu, Pr, Al, and Ga) of lutetium oxide, praseodymium oxide, alumina, and gallium oxide is filled in an alumina container and fired at a temperature of 1300° C. or higher. In a second step, the product obtained in the first step is filled in an alumina container and is fired at a temperature of 1200° C. or higher in a nitrogen-hydrogen mixed atmosphere. In a third step, the product obtained by the second step is molded. In a fourth step, the product obtained by the third step is fired, and thereby each of the fluorescent materials is produced.

Sintering is done in one step. By performing sintering in one step, unlike the case of performing sintering in two steps or more, it is possible to obtain a scintillator that has little deviation in composition and good crystallinity, and has a small decay time constant because it can suppress volatilization of Ga.

The fluorescent materials comprise elements contained in the above-described composition, and do not contain any other elements except for unavoidable impurities. This is because the decay time constant of light emission changes depending on the contained elements, and therefore when a large amount of impurities is contained, the decay time constant of light emission may increase. In each of the fluorescent materials according to examples 1 to 52 (Table 2 and Table 4) and the fluorescent materials according to comparative examples 1 to 58 (Table 3 and Table 5), impurities such as Si, Fe, Ca, and Mg that are contained in a raw material, a sintering aid and the like are several tens of ppm or less. Impurities of 100 ppm or more may be included as long as they comply with the required relative light yield and/or the required decay time constant of light emission.

First, variables x and y in the composition of $(Lu_{1-x}Pr_x)_a(Al_{1-y}Ga_y)_bO_{12}$ will be described by using Table 4 and Table 5. The fluorescent materials according to examples 1 to 38 shown in Table 2 and the fluorescent materials according to comparative examples 1 to 42 shown in Table 3 were produced by varying x and y as variables while fixing a=3 and b=5, in the composition. The relative light yield in Table 2 and Table 3 were obtained by obtaining light emission intensities of the respective fluorescent materials, and converting the light emission intensities into relative values [%] in a case of the light emission intensity of x=0.002 and y=0 being taken as 100[%]. A decay time constant τ [nsec] of fluorescence is obtained as a time until light emission intensity decays to 1/e after X-rays are generated by using a pulse X-ray tube, each of the fluorescent materials are irradiated with the X-rays, and irradiation of X-rays is stopped. The decay time constant τ generally has two or more components. The decay time constant described in each of the examples and comparative examples is a weighted average value calculated from two components and calculated from an intensity ratio thereof.

In addition, the compositions of the fluorescent materials according to examples 1 to 38 shown in Table 2 satisfy $0.005 \leq x \leq 0.025$, and $0.3 \leq y \leq 0.7$. On the other hand, the compositions of the fluorescent materials according to comparative examples 1 to 42 shown in Table 3 do not satisfy $0.005 \leq x \leq 0.025$, or $0.3 \leq y \leq 0.7$, unlike the compositions of the fluorescent materials according to examples 1 to 38 shown in Table 2.

TABLE 2

| a = 3, b = 5 | x | y | Relative Light Yield [%] | Decay Time Constant of Light Emission [nsec] |
|---|---|---|---|---|
| Example 1 | 0.005 | 0.30 | 150 | 15 |
| Example 2 | 0.006 | 0.30 | 155 | 15 |
| Example 3 | 0.010 | 0.30 | 165 | 14 |
| Example 4 | 0.013 | 0.30 | 80 | 13 |
| Example 5 | 0.016 | 0.30 | 70 | 12 |
| Example 6 | 0.020 | 0.30 | 68 | 10 |
| Example 7 | 0.025 | 0.30 | 65 | 10 |
| Example 8 | 0.005 | 0.40 | 165 | 15 |
| Example 9 | 0.006 | 0.40 | 174 | 15 |
| Example 10 | 0.010 | 0.40 | 185 | 15 |
| Example 11 | 0.013 | 0.40 | 87 | 12 |
| Example 12 | 0.016 | 0.40 | 79 | 11 |

TABLE 2-continued

| a = 3, b = 5 | x | y | Relative Light Yield [%] | Decay Time Constant of Light Emission [nsec] |
|---|---|---|---|---|
| Example 13 | 0.020 | 0.40 | 75 | 10 |
| Example 14 | 0.025 | 0.40 | 71 | 9 |
| Example 15 | 0.005 | 0.50 | 95 | 12 |
| Example 16 | 0.006 | 0.50 | 101 | 11 |
| Example 17 | 0.010 | 0.50 | 139 | 11 |
| Example 18 | 0.013 | 0.50 | 70 | 8 |
| Example 19 | 0.016 | 0.50 | 66 | 8 |
| Example 20 | 0.020 | 0.50 | 66 | 7 |
| Example 21 | 0.025 | 0.50 | 60 | 7 |
| Example 22 | 0.005 | 0.55 | 74 | 12 |
| Example 23 | 0.006 | 0.55 | 79 | 11 |
| Example 24 | 0.010 | 0.55 | 92 | 9 |
| Example 25 | 0.013 | 0.55 | 45 | 6 |
| Example 26 | 0.016 | 0.55 | 45 | 6 |
| Example 27 | 0.020 | 0.55 | 46 | 6 |
| Example 28 | 0.025 | 0.55 | 41 | 5 |
| Example 29 | 0.005 | 0.60 | 35 | 6 |
| Example 30 | 0.006 | 0.60 | 39 | 6 |
| Example 31 | 0.010 | 0.60 | 40 | 6 |
| Example 32 | 0.020 | 0.60 | 38 | 4 |
| Example 33 | 0.025 | 0.60 | 35 | 4 |
| Example 34 | 0.005 | 0.70 | 35 | 5 |
| Example 35 | 0.006 | 0.70 | 35 | 5 |
| Example 36 | 0.010 | 0.70 | 39 | 4 |
| Example 37 | 0.020 | 0.70 | 31 | 4 |
| Example 38 | 0.025 | 0.70 | 32 | 3 |

TABLE 3

| a = 3, b = 5 | x | y | Relative Light Yield [%] | Decay Time Constant of Light Emission [nsec] |
|---|---|---|---|---|
| Comparative Example 1 | 0.002 | 0.00 | 100 | 29 |
| Comparative Example 2 | 0.006 | 0.00 | 74 | 22 |
| Comparative Example 3 | 0.010 | 0.00 | 67 | 19 |
| Comparative Example 4 | 0.020 | 0.00 | 52 | 22 |
| Comparative Example 5 | 0.025 | 0.00 | 40 | 21 |
| Comparative Example 6 | 0.030 | 0.00 | 39 | 20 |
| Comparative Example 7 | 0.040 | 0.00 | 24 | 19 |
| Comparative Example 8 | 0.002 | 0.10 | 123 | 19 |
| Comparative Example 9 | 0.006 | 0.10 | 133 | 18 |
| Comparative Example 10 | 0.010 | 0.10 | 125 | 19 |
| Comparative Example 11 | 0.020 | 0.10 | 74 | 17 |
| Comparative Example 12 | 0.030 | 0.10 | 42 | 16 |
| Comparative Example 13 | 0.040 | 0.10 | 34 | 15 |
| Comparative Example 14 | 0.002 | 0.20 | 97 | 19 |
| Comparative Example 15 | 0.006 | 0.20 | 137 | 18 |
| Comparative Example 16 | 0.010 | 0.20 | 145 | 17 |
| Comparative Example 17 | 0.020 | 0.20 | 88 | 15 |
| Comparative Example 18 | 0.025 | 0.20 | 80 | 15 |
| Comparative Example 19 | 0.030 | 0.20 | 55 | 16 |

TABLE 3-continued

| a = 3, b = 5 | x | y | Relative Light Yield [%] | Decay Time Constant of Light Emission [nsec] |
|---|---|---|---|---|
| Comparative Example 20 | 0.040 | 0.20 | 47 | 13 |
| Comparative Example 21 | 0.002 | 0.30 | 90 | 20 |
| Comparative Example 22 | 0.030 | 0.30 | 50 | 10 |
| Comparative Example 23 | 0.002 | 0.40 | 82 | 19 |
| Comparative Example 24 | 0.030 | 0.40 | 60 | 9 |
| Comparative Example 25 | 0.040 | 0.40 | 48 | 7 |
| Comparative Example 26 | 0.002 | 0.50 | 80 | 13 |
| Comparative Example 27 | 0.030 | 0.50 | 50 | 7 |
| Comparative Example 28 | 0.040 | 0.50 | 41 | 6 |
| Comparative Example 29 | 0.002 | 0.55 | 74 | 10 |
| Comparative Example 30 | 0.030 | 0.55 | 36 | 5 |
| Comparative Example 31 | 0.040 | 0.55 | 30 | 5 |
| Comparative Example 32 | 0.002 | 0.60 | 21 | 6 |
| Comparative Example 33 | 0.030 | 0.60 | 25 | 3 |
| Comparative Example 34 | 0.040 | 0.60 | 20 | 3 |
| Comparative Example 35 | 0.002 | 0.70 | 29 | 5 |
| Comparative Example 36 | 0.030 | 0.70 | 20 | 4 |
| Comparative Example 37 | 0.002 | 0.80 | 20 | 5 |
| Comparative Example 38 | 0.006 | 0.80 | 25 | 4 |
| Comparative Example 39 | 0.010 | 0.80 | 23 | 3 |
| Comparative Example 40 | 0.020 | 0.80 | 18 | 3 |
| Comparative Example 41 | 0.030 | 0.80 | 15 | 3 |
| Comparative Example 42 | 0.040 | 0.80 | 10 | 3 |

Each of FIGS. 3A and 3B is a diagram showing characteristics in the fluorescent materials of examples 1 to 38 and the fluorescent materials of comparative examples 1 to 42 as correspondence tables. FIG. 3A shows a relative light yield as characteristics of the fluorescent materials. FIG. 3B shows the decay time constant of the light emission as the characteristics of the fluorescent materials.

According to FIG. 3A, it is found that in a range shown by oblique lines, the relative light yield is 30[%] or more. According to the division (A) of FIG. 3, it is found that in a vicinity of x=0.010, and y=0.4, a peak of the relative light yield, that is, a high characteristic region exists.

According to FIG. 3B, it is found that in a range shown by oblique lines, the decay time constants of light emission are 15 [nsec] or less. According to FIG. 3B, it is found that as a whole, as the variables x and y become larger, that is, as Pr and Ga increase more, the decay time constant of light emission tends to be smaller.

According to FIGS. 3A and 3B, it can be estimated that in the range of $0.013 \leq x \leq 0.016$, and the range of $0.6 \leq y \leq 0.7$, the relative light yield is also 30[%] or more, and the decay time constant of light emission is also 15 [nsec] or less. Therefore, if x and y in the composition represented by $(Lu_{1-x}Pr_x)_a(Al_{1-y}Ga_y)_bO_{12}$ respectively satisfy $0.005 \le x \le 0.025$, and $0.3 \le y \le 0.7$ (inside frames of broken lines in the drawing), it is possible to control the relative light yield to about 30[%] or more, and the decay time constant of light emission to about 15 [nsec] or less.

In other words, the variable y is preferably $0.40 \le y \le 0.55$. A reason thereof will be described. As shown in FIG. 3B, it is possible to decrease the decay time constant of light emission by increasing the variable y. However, if the decay time constant is shortened by this method, there is a problem that the relative light yield is reduced, and when the variable y is 0.60 or more, the light yield tends to decrease sharply (see FIG. 3A). Therefore, in order to obtain a small decay time constant while maintaining a certain amount of light emission, $0.40 \le y \le 0.55$ is preferable. It goes without saying that it is possible to select the variables x and y in the composition arbitrarily, according to the required relative light yield, and/or the required decay time constant of light emission. It is also possible to control the decay time constant of light emission to 10 [nsec] or less by preferable selection of the variables x and y.

Subsequently, variables a and b in the composition of $(Lu_{1-x}Pr_x)_a(Al_{1-y}Ga_y)_bO_{12}$ will be described by using Table 4 and Table 5. The fluorescent materials according to examples 39 to 52 shown in Table 4 and the fluorescent materials according to comparative examples 43 to 58 shown in Table 5 were produced by varying a and b as variables while fixing x=0.010 and y=0.4, in the composition. Relative light yield in Table 4 and Table 5 were obtained by obtaining light emission intensity of each of the fluorescent materials and converting the light emission intensity into a relative value [%] in a case of light emission intensity of x=0.002 and y=0 being taken as 100%. The decay time constant τ [nsec] of fluorescence is obtained as a time until the light emission intensity decays to 1/e after X-rays are generated by using a pulse X-ray tube, each of the fluorescent materials is irradiated with X-rays, and irradiation of X-rays is stopped.

In addition, the compositions of the fluorescent materials according to examples 39 to 52 shown in Table 4 satisfy $2.8 \le a \le 3.1$ and $4.8 \le b \le 5.2$. On the other hand, the compositions of the fluorescent materials according to comparative examples 43 to 58 shown in Table 5 do not satisfy $2.8 \le a \le 3.1$, or $4.8 \le b \le 5.2$, unlike the compositions of the fluorescent materials according to examples 39 to 52 shown in Table 4.

TABLE 4

| x = 0.010, y = 0.4 | a | b | Relative Light Yield [%] | Decay Time Constant of Light Emission [nsec] |
|---|---|---|---|---|
| Example 39 | 3.0 | 5.0 | 185 | 15 |
| Example 40 | 2.9 | 4.8 | 182 | 15 |
| Example 41 | 3.0 | 5.1 | 178 | 15 |
| Example 42 | 2.8 | 5.1 | 175 | 15 |
| Example 43 | 2.8 | 5.2 | 165 | 15 |
| Example 44 | 2.8 | 5.0 | 170 | 15 |
| Example 45 | 2.8 | 4.9 | 165 | 15 |
| Example 46 | 2.8 | 4.8 | 160 | 15 |
| Example 47 | 3.0 | 5.2 | 170 | 15 |
| Example 48 | 3.0 | 4.8 | 173 | 15 |
| Example 49 | 3.1 | 5.2 | 155 | 15 |
| Example 50 | 3.1 | 5.0 | 165 | 15 |
| Example 51 | 3.1 | 4.8 | 164 | 15 |
| Example 52 | 3.0 | 4.9 | 180 | 15 |

TABLE 5

| x = 0.010, y = 0.4 | a | b | Relative Light Yield [%] | Decay Time Constant of Light Emission [nsec] |
|---|---|---|---|---|
| Comparative Example 43 | 2.8 | 4.7 | 124 | 16 |
| Comparative Example 44 | 2.6 | 4.9 | 110 | 15 |
| Comparative Example 45 | 2.5 | 4.7 | 101 | 15 |
| Comparative Example 46 | 3.0 | 5.5 | 141 | 14 |
| Comparative Example 47 | 3.2 | 5.1 | 125 | 14 |
| Comparative Example 48 | 3.4 | 5.0 | 130 | 15 |
| Comparative Example 49 | 3.4 | 5.3 | 133 | 15 |
| Comparative Example 50 | 3.2 | 4.9 | 152 | 16 |
| Comparative Example 51 | 2.8 | 5.3 | 140 | 15 |
| Comparative Example 52 | 3.0 | 5.3 | 145 | 14 |
| Comparative Example 53 | 2.6 | 5.1 | 135 | 15 |
| Comparative Example 54 | 2.6 | 4.8 | 142 | 15 |
| Comparative Example 55 | 3.2 | 4.8 | 132 | 15 |
| Comparative Example 56 | 3.1 | 4.7 | 141 | 15 |
| Comparative Example 57 | 2.6 | 5.2 | 139 | 15 |
| Comparative Example 58 | 3.2 | 5.2 | 130 | 15 |

Each of FIGS. 4A and 4B is a diagram showing characteristics in the fluorescent materials of examples 39 to 52, and the fluorescent materials of comparative examples 43 to 58 as correspondence tables. FIG. 4A shows a relative light yield as the characteristics of the fluorescent materials. FIG. 4B shows a decay time constant of light emission as the characteristics of the fluorescent materials.

According to the division (A) of FIG. 4, it is found that in a range shown by oblique lines, the relative light yield are 150[%] or more. According to the division (A) of FIG. 4, it is found that a peak of the relative light yield, that is, a high characteristic region exists, in a vicinity of a=3.0, and b=5.0. It is also found that a peak of the relative light yield, that is, a high characteristic region exists, in a vicinity of a=2.9, and b=4.8.

According to FIGS. 4A and 4B, it is possible to estimate that the relative light yield are also 150% or more, and the decay time constants of light emission are also 15 nsec or less, in a range of a=2.9, and $4.9 \le b \le 5.2$, in a case of a=3.1 and b=4.9, and in a case of a=3.1 and b=5.1. Therefore, if a and b in the composition represented by $(Lu_{1-x}Pr_x)_a(Al_{1-y}Ga_y)_bO_{12}$ are respectively $2.8 \le a \le 3.1$, and $4.8 \le b \le 5.2$ (within frames of broken lines in the drawing), it is possible to control the relative light yield to about 150% or more, and the decay time constant of light emission to about 15 nsec or less. It goes without saying that it is possible to select the variables a and b in the composition arbitrarily according to the required relative light yield, and/or the required decay time constant of light emission.

Preferable ranges ($2.8 \le a \le 3.1$, $4.8 \le b \le 5.2$) of the aforementioned variables a and b obtained from FIGS. 4A and 4B are obtained with x and y as fixed values (x=0.010, y=0.4). Here, varying x and y as variables, that is, varying a composition ratio corresponds to varying characteristics of garnet itself as the fluorescent material, whereas varying a and b as variables corresponds to varying characteristics due to change of a structure itself of garnet, and occurrence of defects in the garnet structure. For example, when garnet deviates from a constant ratio of a=3 and b=5, phases other than garnet may be mixed in the fluorescent material, and a fluorescent material of an incomplete structure with elemental defects is obtained. The change in characteristics due to change in the garnet structure based on change in a and b like this occurs regardless of the values of x and y. Therefore, preferable ranges ($2.8 \le a \le 3.1$, $4.8 \le b \le 5.2$) of the variables a and b obtained from FIGS. 4A and 4B when x and y are fixed values (x=0.010, y=0.4) are also considered as preferable ranges for cases other than x=0.010 and y=0.4.

If the variables x, y, a and b in the composition represented by $(Lu_{1-x}Pr_x)_a(Al_{1-y}Ga_y)_bO_{12}$ are in the above described ranges, it is possible to provide a fluorescent material with a small decay time constant of light emission. By applying the fluorescent material as a ceramic scintillator of an X-ray detector for a medical application, it is also possible to handle with required reactivity.

According to at least one embodiment described above, it is possible to provide a ceramic scintillator that can handle with a high counting rate, a photon-counting type X-ray detector equipped with it, and a method for manufacturing the ceramic scintillator.

The ceramic scintillator 11 is not limited to the case of being applied to a photon-counting type X-ray detector equipped with a silicon photomultiplier, in X-ray CT equipment. For example, the ceramic scintillator 11 may be applied to an X-ray detector equipped with photodiode, in X-ray CT equipment. The ceramic scintillator 11 may also be applied to a flat panel detector (FPD: Flat Panel Detector) equipped with CMOS (Complementary Metal Oxided Semiconductor). The ceramic scintillator 11 may be applied to a photon-counting type detector equipped with a silicon photomultiplier, in PET (Positron Emission Tomography) equipment. The ceramic scintillator 11 may be applied to imaging for industrial applications such as baggage inspection, and a nondestructive inspection.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A ceramic scintillator having a composition represented by $(Lu_{1-x}Pr_x)_a(Al_{1-y}Ga_y)_bO_{12}$, wherein x, y, a, and b in the composition respectively satisfy $0.005 \le x \le 0.025$, $0.3 \le y \le 0.7$, $2.8 \le a \le 3.1$, and $4.8 \le b \le 5.2$, wherein a decay time constant of light emission is 15 nsec or less, and a relative light yield is 30% or more.

2. The ceramic scintillator according to claim 1, wherein the decay time constant of light emission is 15 nsec, and the relative light yield is 150% or more.

3. The ceramic scintillator according to claim 1, wherein the decay time constant of light emission is 10 nsec or more and less than 15 nsec, and the relative light yield is 65% or more.

4. The ceramic scintillator according to claim 1, wherein the decay time constant of light emission is less than 15 nsec, and the relative light yield is 30% or more.

5. A photon-counting type X-ray detector, comprising:

the ceramic scintillator according to claim 1; and a silicon photomultiplier.

6. A photon-counting type X-ray detector, comprising:

the ceramic scintillator according to claim 2; and a silicon photomultiplier.

7. A photon-counting type X-ray detector, comprising:

the ceramic scintillator according to claim 3; and a silicon photomultiplier.

8. A photon-counting type X-ray detector, comprising:

the ceramic scintillator according to claim 4; and a silicon photomultiplier.

9. A method for manufacturing the ceramic scintillator according to claim 1, comprising:

a first step of filling an alumina container with a mixture of oxide powders of Lu, Pr, Al and Ga in the composition, and firing the mixture at a temperature of 1300° C. or higher;

a second step of filling an alumina container with a product obtained by the first step, and firing the product at a temperature of 1200° C. or higher in a nitrogen-hydrogen mixed atmosphere;

a third step of molding a product obtained by the second step; and sintering a product obtained by the third step to manufacture the ceramic scintillator.

10. A method for manufacturing the ceramic scintillator according to claim 2, comprising:

a first step of filling an alumina container with a mixture of oxide powders of Lu, Pr, Al and Ga in the composition, and firing the mixture at a temperature of 1300° C. or higher;

a second step of filling an alumina container with a product obtained by the first step, and firing the product at a temperature of 1200° C. or higher in a nitrogen-hydrogen mixed atmosphere;

a third step of molding a product obtained by the second step; and sintering a product obtained by the third step to manufacture the ceramic scintillator.

11. A method for manufacturing the ceramic scintillator according to claim 4, comprising:

a first step of filling an alumina container with a mixture of oxide powders of Lu, Pr, Al and Ga in the composition, and firing the mixture at a temperature of 1300° C. or higher;

a second step of filling an alumina container with a product obtained by the first step, and firing the product at a temperature of 1200° C. or higher in a nitrogen-hydrogen mixed atmosphere;

a third step of molding a product obtained by the second step; and sintering a product obtained by the third step to manufacture the ceramic scintillator.

12. A method for manufacturing the ceramic scintillator according to claim 4, comprising:

a first step of filling an alumina container with a mixture of oxide powders of Lu, Pr, Al and Ga in the composition, and firing the mixture at a temperature of 1300° C. or higher;

a second step of filling an alumina container with a product obtained by the first step, and firing the product at a temperature of 1200° C. or higher in a nitrogen-hydrogen mixed atmosphere;

a third step of molding a product obtained by the second step; and sintering a product obtained by the third step to manufacture the ceramic scintillator.

* * * * *